United States Patent
Ma

[11] Patent Number: 5,379,735
[45] Date of Patent: Jan. 10, 1995

[54] TUNED INTAKE SYSTEM

[75] Inventor: Thomas T. Ma, South Woodham Ferrers, United Kingdom

[73] Assignee: Ford Motor Company, Dearborn, Mich.

[21] Appl. No.: 162,129
[22] PCT Filed: Jun. 10, 1992
[86] PCT No.: PCT/GB92/01034
§ 371 Date: Dec. 9, 1993
§ 102(e) Date: Dec. 9, 1993
[87] PCT Pub. No.: WO92/22737
PCT Pub. Date: Dec. 23, 1992

[30] Foreign Application Priority Data

Jun. 11, 1991 [GB] United Kingdom ............. 9112562

[51] Int. Cl.⁶ ............................................. F02M 25/06
[52] U.S. Cl. ............................................. 123/184.42
[58] Field of Search .................... 123/52 M, 52 MC

[56] References Cited

U.S. PATENT DOCUMENTS

| | | | |
|---|---|---|---|
| 3,845,746 | 11/1974 | Elsbett | 123/52 M |
| 4,228,769 | 10/1980 | Gartner et al. | 123/52 M |
| 4,318,371 | 3/1982 | McFarland | 123/52 M |
| 4,409,934 | 10/1983 | Kaindl | 123/52 M |
| 4,497,287 | 2/1985 | Schleiermacher et al. | 123/52 M |
| 5,094,210 | 3/1992 | Endres et al. | 123/52 M |

Primary Examiner—E. Rollins Cross
Assistant Examiner—M. Macy
Attorney, Agent, or Firm—Jerome R. Drouillard; Roger L. May

[57] ABSTRACT

An intake system for an internal combustion engine has a plurality of intake tracts connected in use to extend from individual engine intake ports to a common plenum chamber and a common passage opening into the plenum chamber for supplying air to all the intake ports. The tracts are arranged to open into the plenum chamber in pairs associated with pairs of intake ports, each pair of intake ports having valve events which do not overlap. The ends of each pair of tracts disposed within the plenum chamber are arranged directly facing one another and are separated by a gap which is sufficiently wide to permit mass air flow between the respective tracts and the common passage but which is sufficiently narrow to couple most of any pressure wave energy emanating from one tract directly into the facing tract.

3 Claims, 2 Drawing Sheets

TUNED INTAKE SYSTEM

FIELD OF THE INVENTION

The invention relates to the tuning of the intake system of an internal combustion engine.

BACKGROUND OF THE INVENTION

Conventionally the intake tracts of a multi-cylinder engine are brought together to a common plenum chamber, each tract opening into the plenum chamber at a point which is designed to experience the minimum flow interference from the other tracts. The tracts function as tuned lengths for which there is one engine speed where the torque is enhanced because of resonance of the pressure wave excitations within the intake system. More specifically, when the inlet valve starts to open, at the beginning of a four stroke cycle, the combustion chamber is still under pressure from the exhaust stroke of the previous cycle and a pressure wave passes out of the intake port and propagates at the speed of sound along the intake tract. This wave travels the entire length of the intake tract until it reaches the plenum chamber at which point it is reflected with opposite phase. A further three traverses of the entire length of the intake tract and two reflections at the open and closed ends of the tract are necessary before the wave again reaches the intake port as a positive pressure wave.

Thus, with a fixed length tract, there are engine speeds at which the reflected pressure wave increases the charge density at the instant when the inlet valve closes so as to improve volumetric efficiency but other speeds when the wave arrives as a negative pressure tending to reduce volumetric efficiency.

To obtain an improvement at low engine speeds, a long tract length is required but this has the disadvantage of increasing the package size and the resistance to flow at high engine speeds.

Variable length manifolds have been proposed to avoid the performance degradation at certain engine speeds but these do not provide the solution to the packaging problems in designing a manifold which will resonate at low engine speeds.

OBJECT OF THE INVENTION

The invention therefore seeks to provide a longer tuned length without increasing the size of the intake system and to avoid performance degradation from reflected waves having a negative pressure.

SUMMARY OF THE INVENTION

According to the present invention, there is provided an intake system for an internal combustion engine having a plurality of intake tracts of equal length connected in use to extend from individual engine intake ports to a common plenum chamber, and a common passage opening into the plenum chamber for supplying air to all the intake ports, wherein the tracts are arranged to open into the plenum chamber in pairs associated with intake ports of which the intake valve events do not overlap, characterised in that the ends of each pair of tracts disposed within the plenum chamber are arranged directly facing one another and are separated by a gap which is narrower than the diameter of the tracts, the gap being sufficiently wide to permit mass air flow between the respective tracts and the common passage but being sufficiently narrow to couple most of any pressure wave energy emanating from one tract directly into the other tract.

PREFERRED FEATURES OF THE INVENTION

Preferably, the gap between the ends of the tracts within the plenum chamber should be between one quarter and one half of the diameter of the tracts.

This arrangement permits mass air flow to enter freely into either one of the intake tracts yet at the same time a pressure wave coming from either tract is transmitted across to the opposite tract which now functions as a resonance column with a closed end. By ensuring good coupling of the pressure wave across the facing pipes, the effective tuned length is made equal to the combined length of the two tracts and the pressure wave can propagate several times along its length with closed-end reflections at both ends. Because both ends of the resonating column are closed, the pressure wave suffers no pressure inversion as would be the case in a conventional tract.

Because no reflection is inverted, there are twice as many engine speeds at which the resonance tuning is effective and the engine will experience torque enhancement at low speed as well as at high speed. This is achieved with no increase in size relative to a conventional intake system and no need of a variable geometric system. There is also no increase in friction as the tract carrying the flow is short.

In a preferred embodiment, an elliptical acoustic chamber is disposed within the plenum chamber about the ends of the tracts in order to improve the coupling of pressure waves across the facing tracts.

In an alternative embodiment of the invention, the ends of the tracts are connected to parallel plates separated by a narrow gap and a control pipe is provided for injecting air tangentially into the gap at a distance from the pipes to create a vortex, thereby forming a vortex amplifier.

Intake manifolds are known, for example from GB 620,251, GB 1 510 831 and U.S. Pat. No. 4,466,389 in which the ends of the tracts from individual cylinders are arranged facing one another as in the present invention but are separated by a plenum chamber wider than the tract diameter. In this case, acoustic waves cannot cross the plenum chamber to enter the facing tract but instead the waves are reflected with inversion and travel back along the same tract.

BRIEF DESCRIPTION OF THE DRAWINGS

The invention will now be described further, by way of example, with reference to the accompanying drawings, in which.

DETAILED DESCRIPTION OF THE PREFERRED EMBODIMENTS

Figure 1:
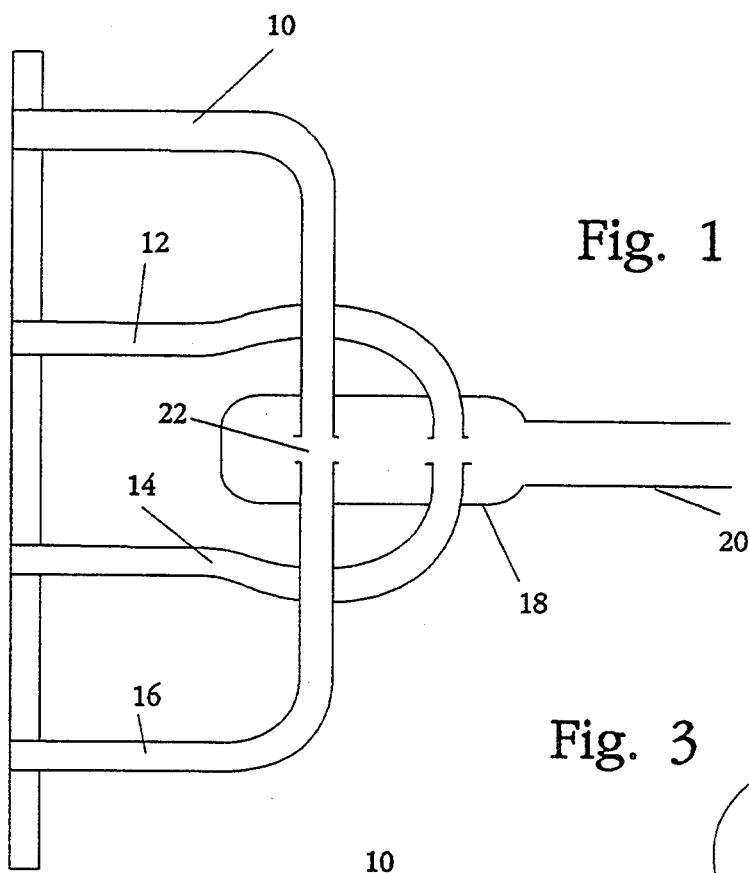
FIG. 1 is a schematic section through a first embodiment of the invention.

FIG. 1 shows an intake manifold comprising four tracts 10, 12, 14 and 16 leading from different ones of four engine cylinders to a common plenum chamber 18. A passage 20 supplies air to the plenum chamber and is connected in the usual manner (not illustrated) to a throttle for regulating the air supply and an intake air filter.

The ends of the tracts terminate inside the plenum chamber in such a manner that the end of the tract 10 directly faces the end of the tract 16 and the end of the tract 12 directly faces the end of the tract 14. In each pair of facing tracts, the associated cylinders have non-overlapping valve events so that when the intake valve at the end of one of the tracts is open the valve at the end of the other is closed. The separation between the ends of the tracts is approximately one quarter of the diameter of the tracts. The peripheral area of the gaps 22 is therefore substantially equal to the cross sectional area of each tract so that air can readily flow in each tract from the plenum chamber 20.

When an inlet valve opens, the associated cylinder is still under pressure and this sends a pressure wave up the intake tract. Because the ends of the intake tracts are close to one another, this pressure wave does not pass out into the plenum chamber but is directly coupled across into the facing tract. On reaching the end of this tract, it will find the valve closed and will therefore be reflected without inversion back towards the first tract, thereby creating an oscillating air column having a length equal to the combined length of the two intake tracts.

As compared with a convention tuned intake manifold, this offers a first advantage that the individual tracts may effectively be halved in length for improvement at a given engine speed. Furthermore, because the pressure does not undergo inversion at any reflection, volumetric efficiency is not reduced at any engine speed.

As in the case of any engine with a tuned manifold, it is important in the present invention to ensure that the intake tracts be of the same length.

Figure 3:
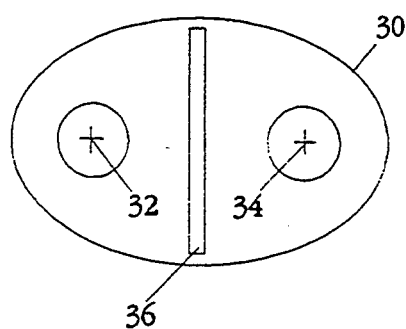
FIG. 3 is a section along the line III—III in FIG. 2.
Figure 2:
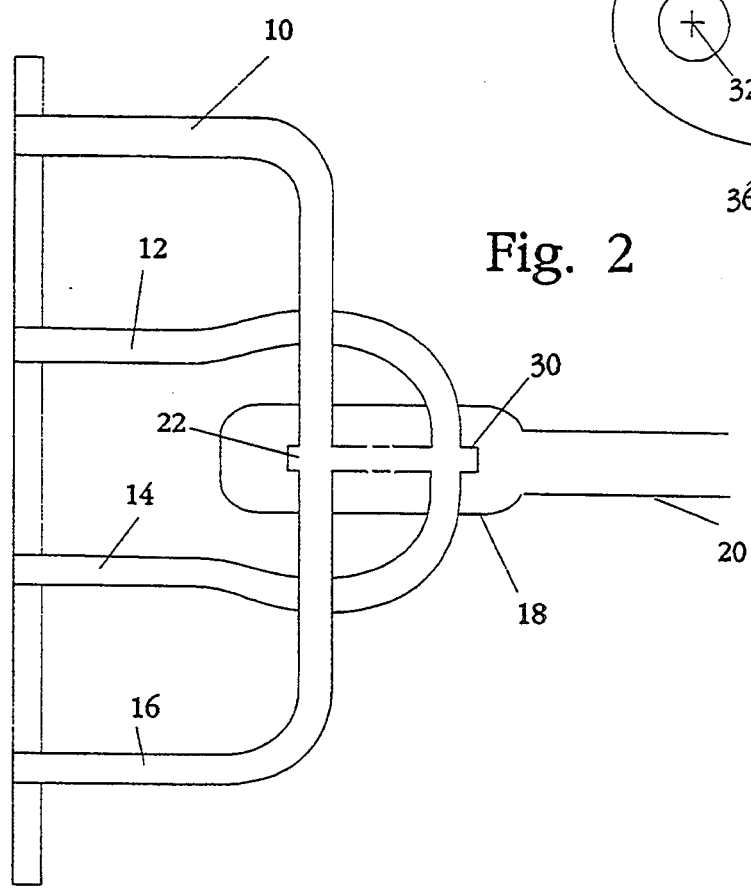
FIG. 2 is a schematic section through an alternative embodiment of the invention.

The embodiment of FIG. 2 differs from that of FIG. 1 in that an elliptical reflecting cavity 30 is housed within the plenum chamber 18. The cavity, which is shown in plan in FIG. 3, has the property that pressure waves emanating at either one of the two conjugate loci, designated 32 and 34 in FIG. 3, are focussed at the other. If the tracts of at the other one of the conjugate foci are closed then the wave will eventually be reflected back to the first of the conjugate foci. As a result, any energy escaping through the gap 22 between facing tracts will be reflected back to the tract. The reflecting cavity 30 has an opening 36 midway between the points 32 and 34 through which air can flow to the tracts without allowing escape of the pressure waves.

Figure 4:
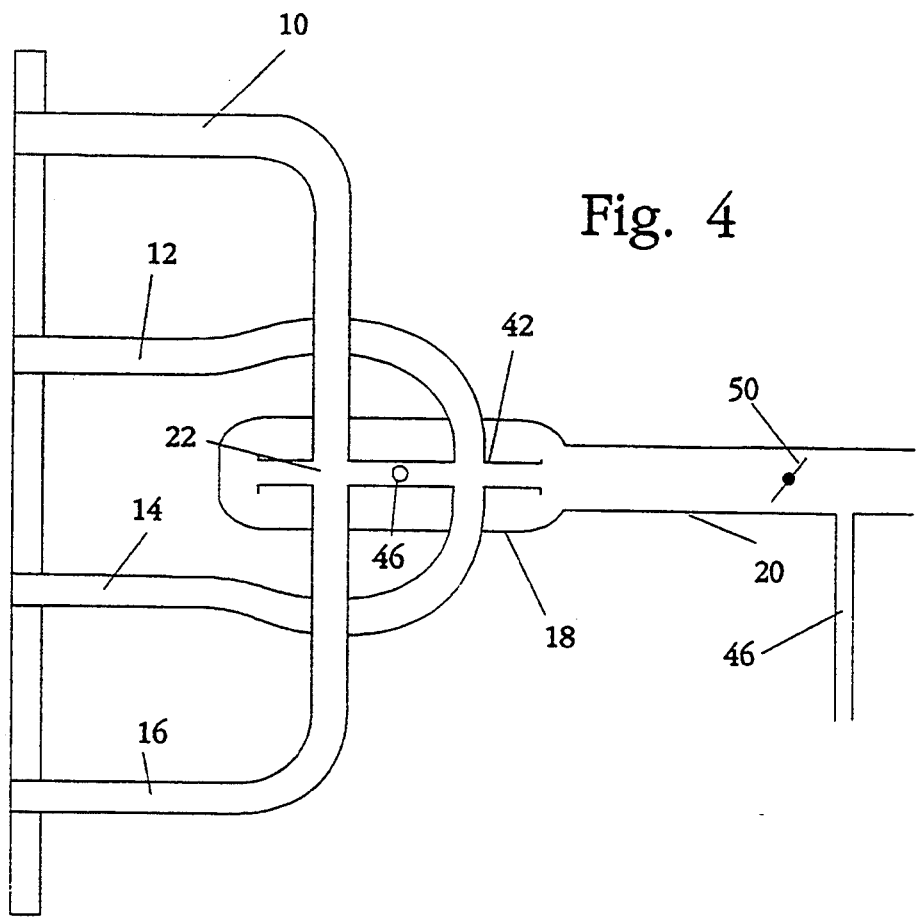
FIG. 4 is a schematic section through a further embodiment of the invention.
Figure 5:
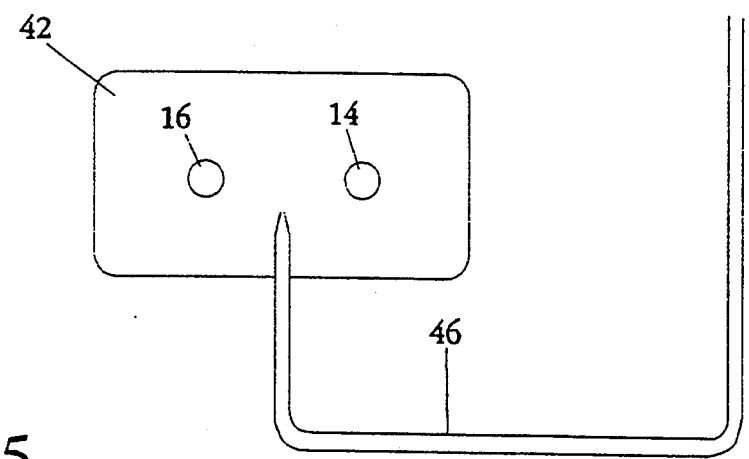
FIG. 5 is a section along the line V—V in FIG. 4.

In the embodiment of the FIGS. 4 and 5 the gap between facing tracts is made to function as a vortex amplifier, thereby allowing the tracts to be individually throttled. The ends of the tracts 10 and 12 are joined to a plate 42 and the ends of the tracts 14, 16 are joined to a second plate 44 parallel to the plate 42 and spaced from it by a distance approximately equal to one quarter of the diameter of the tracts so that, as previously, the pressure wave can traverse the gap between the ends of facing tracts. A pipe 46 connected upstream of the butterfly throttle 50 injects air into the gap at a point midway between the centres of the tracts, the air stream being directed tangentially.

When the throttle is wide open, there is no significant pressure difference across the ends of the pipe 46 and no air enters the gap from the pipe 46. The air mass flows in radially from the periphery of the two plates 42, 44 towards whichever cylinder is drawing in air at that instant. However, when the throttle is closed or partly closed, the pressure difference across the ends of the pipe 46 which lies in parallel with the throttle 50 will cause a control air flow to create a vortex tending to throttle the tract of the cylinder drawing in air at that instant.

The same source of control air throttles all four cylinders in turn which ensures that the cylinders are balanced and that only a small amount of air is used in the control of the entire engine, thereby permitting a low idling speed to be achieved while reducing air pumping losses.

I claim:

1. An intake system for an internal combustion engine having a plurality of intake tracts (10, 12, 14, 16) of equal length connected in use to extend from individual engine intake ports to a common plenum chamber (18), and a common passage (20) opening into the plenum chamber (18) for supplying air to all the intake ports, wherein the tracts (10, 12, 14, 16) are arranged to open into the plenum chamber (18) in pairs associated with pairs of intake ports, each pair of intake ports having intake valve events which do not overlap with each other, with the ends of each pair of tracts (10, 16, 12, 14) being disposed within the plenum chamber (18) so as to directly face one another, with the tracts being separated by a gap (22) which is narrower than the diameter of the tracts (10, 12, 14, 16), and with the gap (22) being sufficiently wide to permit mass air flow between the respective tracts (10, 12, 14, 16) and the common passage (20) but being sufficiently narrow to couple most of any pressure wave energy emanating from one tract (e.g. 10) directly into the facing tract (e.g. 16).

2. An intake system as claimed in claim 1, wherein the gap (22) between the ends of the tracts within the plenum chamber is between one quarter and one half of the diameter of the tracts (10,12,14,16).

3. An intake system as claimed in claim 1, wherein an elliptical acoustic chamber (30) is disposed within the plenum chamber (18) about the ends of two pairs of tracts in order to improve the coupling of pressure waves across the facing tracts, said two pairs of tracts being connected at the conjugate foci of the elliptical acoustic chamber (30).

* * * * *